(12) United States Patent
Allard et al.

(10) Patent No.: US 9,358,630 B2
(45) Date of Patent: Jun. 7, 2016

(54) ELECTRODE-CHANGING DEVICE HAVING IMPROVED SAFETY

(75) Inventors: Jean-Luc Allard, Mejannes-le-Clap (FR); Jean-Pierre Schwanck, Saint Paul Trois Chateaux (FR)

(73) Assignee: AREVA NC, Paris (FR)

( * ) Notice: Subject to any disclaimer, the term of this patent is extended or adjusted under 35 U.S.C. 154(b) by 700 days.

(21) Appl. No.: 13/515,257

(22) PCT Filed: Dec. 9, 2010

(86) PCT No.: PCT/EP2010/069229
§ 371 (c)(1),
(2), (4) Date: Jul. 19, 2012

(87) PCT Pub. No.: WO2011/070093
PCT Pub. Date: Jun. 16, 2011

(65) Prior Publication Data
US 2012/0279062 A1 Nov. 8, 2012

(30) Foreign Application Priority Data
Dec. 11, 2009 (FR) ...................................... 09 58885

(51) Int. Cl.
*B23K 9/12* (2006.01)
*B23K 9/26* (2006.01)
*B23K 9/167* (2006.01)

(52) U.S. Cl.
CPC ... *B23K 9/26* (2013.01); *B23K 9/12* (2013.01); *B23K 9/167* (2013.01); *Y10T 29/49002* (2015.01); *Y10T 29/49204* (2015.01); *Y10T 29/53274* (2015.01)

(58) Field of Classification Search
CPC ............. B23K 9/12; B23K 9/167; B23K 9/26
USPC ....................... 29/762, 426.1, 428, 746, 592.1
See application file for complete search history.

(56) References Cited

FOREIGN PATENT DOCUMENTS

| FR | 2094353 | 2/1972 |
|---|---|---|
| GB | 1317500 | 5/1973 |
| JP | S59-1474 A | 1/1984 |
| JP | S59-1474 U | 1/1984 |
| JP | 3226380 | 7/1991 |
| JP | H04-4979 A | 1/1992 |
| JP | 06304756 A * | 11/1994 |

(Continued)

OTHER PUBLICATIONS

International Search Report and Written Opinion in PCT/EP2010/069229, mailed Mar. 25, 2011.

(Continued)

*Primary Examiner* — Livius R Cazan
(74) *Attorney, Agent, or Firm* — Nixon Peabody LLP

(57) ABSTRACT

Device for removing an electrode from an electrode holder and/or fitting an electrode into an electrode holder, said electrode holder forming part of a welding device, said device comprising a spent electrode receptacle provided with an orifice and an assembly mounted on said orifice, said assembly comprising a through passage with a longitudinal axis connecting a housing to hold one end of the electrode holder forming a mandrel, and the receptacle, said longitudinal axis being designed to be approximately vertical, means of tightening or loosening an electrode holder mandrel, means of fixing the electrode to said device and means of enabling or disabling dropping of the spent electrode into the receptacle.

26 Claims, 11 Drawing Sheets

(56) References Cited

FOREIGN PATENT DOCUMENTS

| JP | 2001108786 | | 4/2001 |
| JP | 2001108786 A | * | 4/2001 |
| JP | 2002122692 | | 4/2002 |
| JP | 2002122692 A | * | 4/2002 |
| JP | 2008272805 | | 11/2008 |
| RU | 2323807 | | 5/2008 |
| WO | 2011070093 | | 6/2011 |

OTHER PUBLICATIONS

Preliminary Search Report in French Patent Application No. 0958885, mailed Jul. 15, 2010.

International Preliminary Report on Patentability in PCT/EP2010/069229, mailed Jun. 21, 2012.

Notification of Reasons for Refusal for Japanese Patent Application No. 2012-542546 dated Nov. 4, 2014.

* cited by examiner

ELECTRODE-CHANGING DEVICE HAVING IMPROVED SAFETY

CROSS REFERENCE TO RELATED APPLICATIONS OR PRIORITY CLAIM

This application is a National Phase of PCT/EP2010/069229, filed Dec. 9, 2010, entitled, "ELECTRODE-CHANGING DEVICE HAVING IMPROVED SAFETY", which claims the benefit of French Patent Application No. 09 58885, filed Dec. 11, 2009, the contents of which are incorporated herein by reference in their entirety.

TECHNICAL FIELD AND PRIOR ART

This invention relates to an electrode-changing device and more particularly a device for placement and removal of an electrode on a device designed for manufacturing a nuclear fuel rod.

A fuel rod comprises a cladding inside which nuclear fuel pellets are placed and a plug to close the cladding.

The plug is then welded around its entire periphery by a first welding device. The plug comprises a bore through which the fuel rod is filled with a gas. This bore is then closed off by another welding device called the seal welding device.

Each of these welding devices comprises an electrode to do the welding. This electrode is subject to wear and must be replaced. This replacement is then done manually by an operator.

One end of the electrode is fitted in an electrode holder tool, and the other end is used for welding.

When he wants to replace the electrode, the operator grips its free end with his fingers and pulls it to remove it from the electrode holder. When he wants to put a new electrode into position, he grips the electrode at the welding end and inserts the other end into the electrode holder.

Furthermore, these devices are installed in glove boxes, isolating the fuel rods from the operator. The only way the operator can take action on the welding devices is through gloves fixed on a wall of the glove box. Therefore, these operations are difficult.

The integrity of the confinement must be ensured, and consequently the tearing the gloves must be avoided. But the end of the electrodes used for welding is extremely sharp. Consequently, the operator can tear his gloves when changing the electrode.

Remember that the inside of the glove boxes can be contaminating, and such a tear can then contaminate the operator and the external environment.

PRESENTATION OF THE INVENTION

Consequently, one purpose of this invention is to offer a device to replace the electrodes offering extra safety for the operator, more particularly to protect against risks of tearing by the electrode.

The purpose mentioned above is achieved by an electrode replacement device comprising a spent electrode receptacle, means of separating the electrode from the electrode holder or fixing it to the electrode holder, means of fixing it to the replacement device and the spent electrode then dropping by gravity into the receptacle, the electrode holder being in a vertical position during the replacement steps.

This device can then prevent any manipulation of the spent electrode and reduce manipulation steps of a new electrode.

With the device according to this invention, the operator only needs to insert the end that is not sharp of the new electrode into the device, since none of the other steps require any direct contact with the electrode.

Advantageously, the device can be used to install the new electrode directly at the right dimension.

The subject-matter of this invention is then a device for removing an electrode from an electrode holder and/or fitting an electrode into the electrode holder, said electrode holder forming part of a welding device, said device comprising a spent electrode receptacle provided with an orifice and an assembly mounted on said orifice, said assembly comprising a through passage with a longitudinal axis connecting a housing to hold one end of the electrode holder forming a mandrel and the receptacle, said longitudinal axis being designed to be approximately vertical, means of tightening or loosening an electrode holder mandrel, means of fixing the electrode to said device and means of enabling or disabling dropping of the spent electrode into the receptacle.

For example, the tool comprises a housing and means of tightening or loosening the electrode holder mandrel and means of fixing the electrode to said device, and a support mounted on the orifice of the receptacle that comprises means of enabling or disabling dropping of the spent electrode into the receptacle.

For example, the means of tightening or loosening the electrode holder mandrel are formed by a recess present in said housing corresponding to the impression of the mandrel tightening/loosening nut. The recess may be formed either directly by the sidewalls of the housing, or in an add-on insert in the bottom of the housing.

The means of fixing the electrode to said device may comprise two elements free to move about two pins and provided with two ends that will come into contact with the electrode to grip it. For example, the two mobile elements are contained in a plane containing the longitudinal axis or in a plane perpendicular to the longitudinal axis. Return means are advantageously provided to return the two mobile elements into the position in which they are separate from each other, to fix the electrode to said device.

Advantageously, the means to enable or disable dropping of the spent electrode into the receptacle may for example comprise a closer closing off the longitudinal passage in which there is an orifice that is not aligned with said passage when in the rest position, and which can be aligned with it by manipulating the closer. The closer may be installed free to slide along an axis orthogonal to the longitudinal axis in the support. Means are advantageously provided to return the closer into the position to close off the passage.

For example, the closer comprises a plate provided with said orifice and a control rod accessible from outside the support.

The device for removal of an electrode from an electrode holder and/or assembly of an electrode in an electrode holder advantageously comprises means of adjusting the distance between the closer and the housing of said mandrel of the device. For example, the tool is installed on the support by means of at least two threaded rods, the adjustment means are formed by nut and/or counter-nut assemblies screwed onto the threaded rods.

The device may also comprise an electrode holder support, the electrode holder comprising a tapered part at its end holding the electrode, said electrode holder support forming a tapered housing corresponding to the shape of the tapered part of the electrode holder and forming an upstream extension of the electrode holder housing. The electrode holder support may for example be fixed to said tool along its axial direction and is free to pivot relative to it about the longitudinal axis.

For example, the electrode holder support comprises an annular stand opposite an end through which the electrode holder is inserted, said stand fitting into a housing in said tool. The electrode holder support may comprise an internal thread to cooperate with the thread on the electrode holder, said thread being on the upstream side of the tapered housing.

The device may then comprise means of axially retaining the electrode holder support formed by tabs fixed on the tool.

Another subject-matter of this invention is a method of removing an electrode from an electrode holder by means of the device according to this invention, comprising the following steps:
- insert the electrode holder into the housing, the mandrel tightening element penetrating into the tightening/loosening means and the free end of the electrode coming into contact with the closer,
- apply a loosening torque to the electrode holder,
- fix the electrode to said device,
- remove the electrode holder,
- detach the electrode from said device,
- open the passage leading to the receptacle and the electrode drops by gravity into said receptacle.

The loosening torque may be applied to said electrode holder support and transmitted to the electrode holder.

When the electrode holder is inserted into the housing, the electrode holder is advantageously screwed into the electrode holder support.

Another subject-matter of this invention is a method of fitting an electrode into an electrode holder using the device according to this invention, comprising the following steps:
- put the electrode into place in the passage, the sharp end of the electrode coming into contact with the closer,
- put the electrode holder with no electrode into position in the housing, the end of the electrode projecting from the device penetrating into the mandrel,
- apply a tightening torque to the mandrel, fixing the electrode to the mandrel,
- remove the electrode holder fitted with the electrode.

The tightening torque can be applied to said electrode holder support and transmitted to the electrode holder.

Advantageously, the electrode holder is screwed into the electrode holder support before or during insertion of the electrode holder into the housing, and the electrode holder is moved away from the electrode holder support before or during removal of the electrode holder.

BRIEF DESCRIPTION OF THE DRAWINGS

This invention will be better understood after reading the following description and the drawings in which.

DETAILED PRESENTATION OF PARTICULAR EMBODIMENTS

The devices described have general symmetry about a longitudinal X-axis.

Figure 1A:
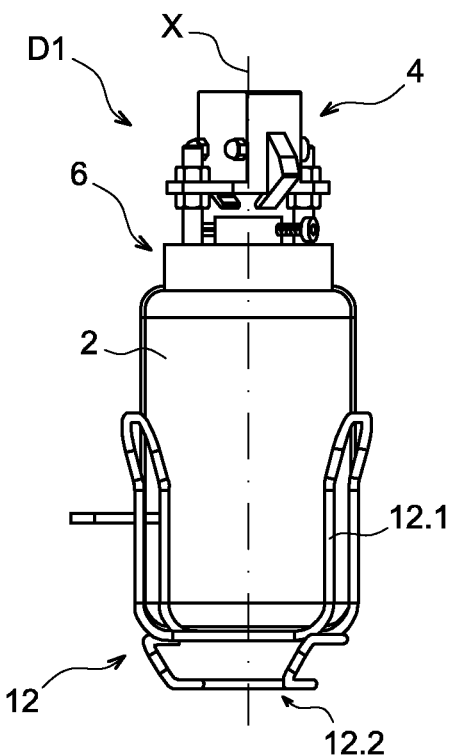
FIG. 1A shows a front view of a first embodiment of an electrode replacement device.
Figure 1B:
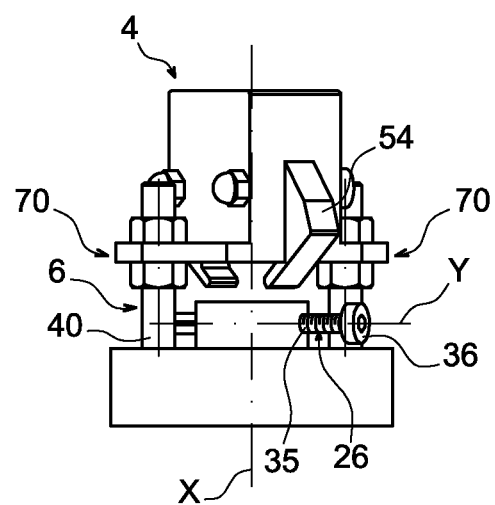
FIG. 1B shows a detailed view of part of FIG. 1A.

FIGS. 1A and 1B show a side view of a first example D1 of an electrode replacement device, particularly adapted to replacements of electrodes for welding a plug onto the cladding of a nuclear fuel rod.

Device D1 comprises a receptacle 2 that intends to contain spent electrodes, an electrode replacement tool 4 to remove or place an electrode on an electrode holder, and a support 6 for an electrode replacement tool mounted removably on the receptacle 2 that also forms a plug for the receptacle.

The device D1 has a longitudinal X-axis and a passage 7 for an electrode with an X-axis passing through the tool 4 and the support 6 and opening up in the receptacle 2.

Figure 2:
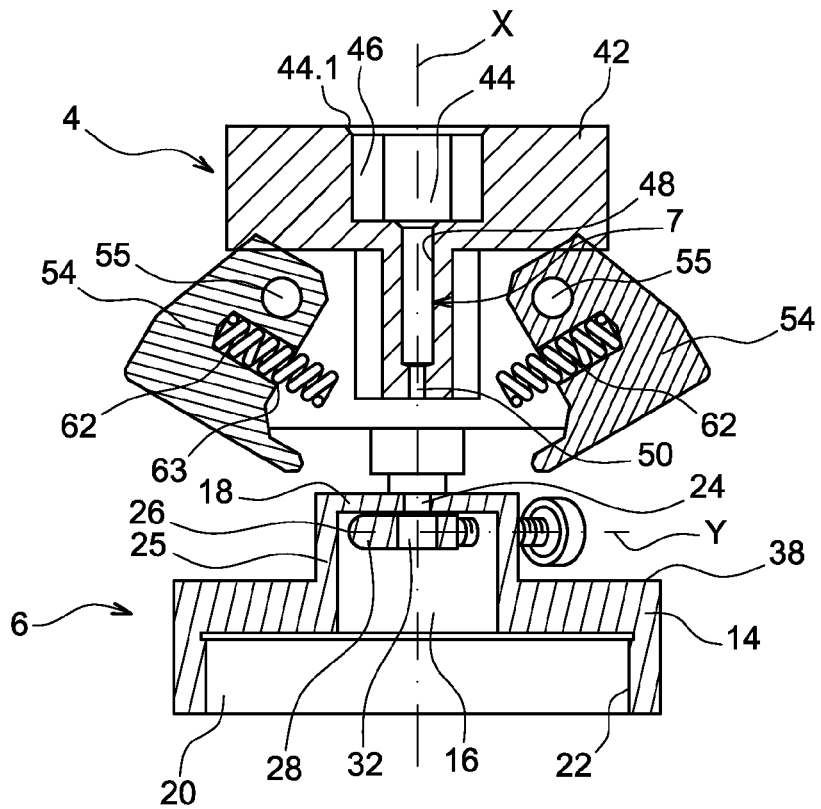
FIG. 2 shows a longitudinal sectional view of the upper part of the device in FIG. 1A.
Figure 3:
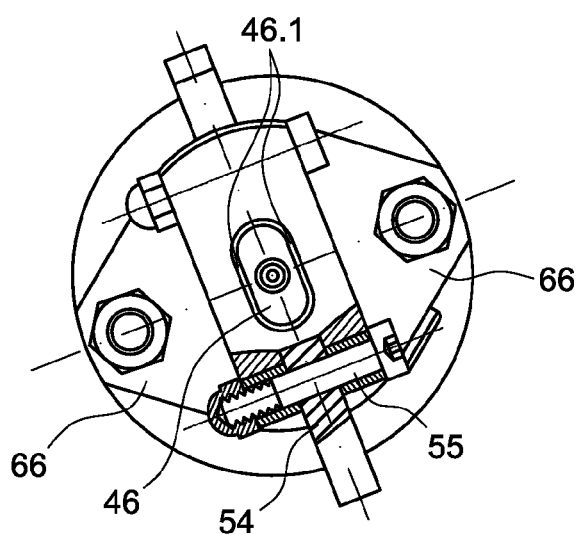
FIG. 3 shows a top view of the device in FIG. 1A in partial cutaway

The passage 7 can be seen in the sectional view in FIG. 2.

The electrode replacement tool 4 will be denoted by "tool 4" in the remainder of the description for reasons of simplicity.

Figure 8:
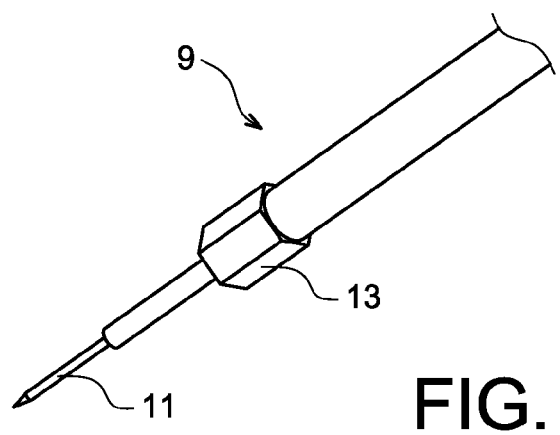
FIG. 8 is a perspective view of an electrode holder fitted with an electrode, to which the device in FIG. 1A is particularly well suited.

FIG. 8 shows an example of an electrode holder 9 of a welding device to which device D1 is adapted.

The electrode holder 9 comprises an elongated body provided with a mandrel at one end that will hold an electrode 11 in position; the mandrel comprises a locking nut 13 for locking the electrode 11.

The receptacle 2 is formed by a flask provided with an upper orifice (not visible) surrounded by a neck (not visible). In the example shown, the receptacle is fitted in a structure 12 holding the receptacle in the vertical position.

In the example shown, the support structure 12 is made of a frame made of bent metal wires describing firstly a housing 12.1 for the receptacle, and secondly stands 12.2 to keep the receptacle in a stable vertical position.

Any other support structure, for example made of moulded plastic, may be suitable and does not go outside the scope of this invention.

The neck is advantageously fitted with a thread to fix the support 6 onto the receptacle.

However, any other means of fixing could be used, for example click fitting or a bayonet type connection.

Figure 4A:
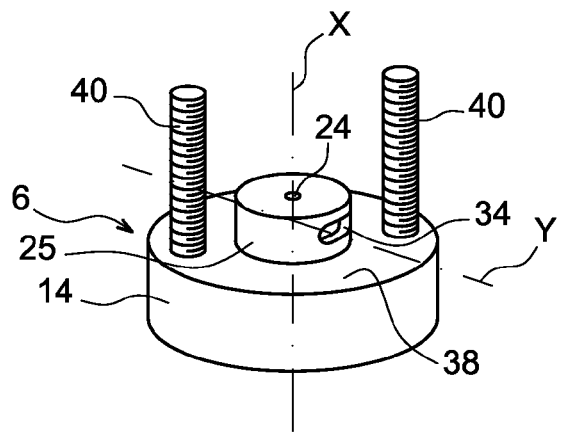
FIG. 4A is a perspective view of an isolated part of the device in FIG. 1A forming the support.
Figure 4B:
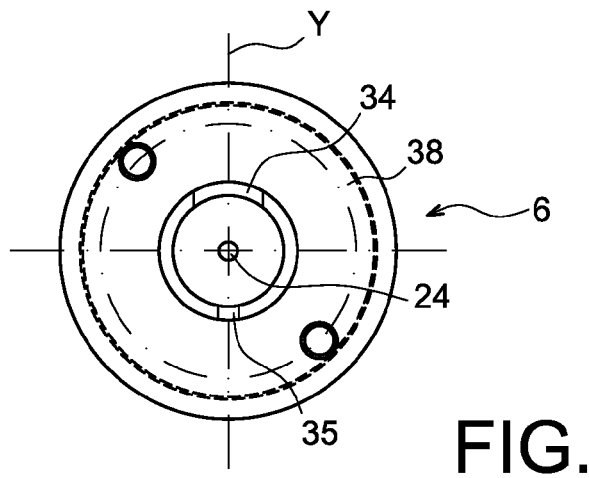
FIG. 4B is a top view of FIG. 4A.

The tool support 6, that can be seen particularly clearly in FIGS. 2, 4A and 4B, comprises a body 14 with a longitudinal X axis provided with a through passage 16 that also has a longitudinal X-axis, through which a spent electrode can pass towards the inside of the receptacle 2.

The body 14 also comprises an end wall 18 at a first longitudinal end oriented towards the tool 4, and a circular recess 20 bordered by an internal thread 22 at a second longitudinal end, cooperating with the thread on the neck of the receptacle, therefore the neck is housed in the recess 20.

The wall 18 comprises an orifice 24 forming one end of the passage 16.

The body 14 comprises an intermediate part 25 between the end wall 18 and the recess 20, into which a closer 26 of the orifice 24 fits, free to move in the body 14 along a Y-axis orthogonal to the longitudinal X-axis.

The closer 26 slides along a face of the wall 18 opposite the wall oriented towards the tool 4.

Figure 5:
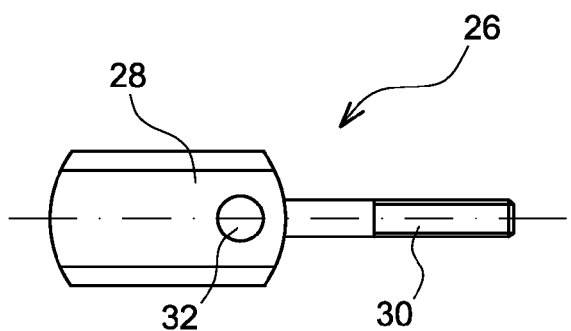
FIG. 5 is a top view of a closer that will be installed in the support in FIG. 4A.

FIG. 5 shows an example of a slide type closer 26 shown alone comprising a plate 28 and a control rod 30 fixed to one end of the plate 28.

The plate 28 is itself provided with a through orifice 32 with a sufficiently large diameter to allow the passage of an electrode.

The intermediate part 25 comprises a sidewall provided with a lateral mortise 34 inside which the plate 28 slides and diametrically opposite, a transverse bore 35 with Y-axis inside which the control rod 30 slides.

When the plate 28 is moved along the Y-axis by means of the control rod 30, the orifice 32 of the plate may be aligned with the through orifice 24 of the end wall 18, then allowing an electrode to pass through the support 6 and drop into the receptacle 2.

The plate 28 is normally in the closed position. Advantageously, an elastic return means is provided to bring the plate 28 back into the position closing the through orifice 24.

The example shown includes a helical spring mounted in reaction between the outside surface of the intermediate part 25 and a button 36 fixed to the free end of the control rod 30.

In the example shown, the through orifice 32 of the plate 28 is positioned such that a force has to be applied on the control rod 30 along the direction of the X-axis of the control rod, to align the orifice in the plate with the through orifice 24 in the end wall.

As a variant, the closer can be designed such that a separation force is applied along the X axis to align the orifices 24 and 32, i.e. a tension force is applied on the rod 30.

In the example shown, the plate advantageously comprises thinned lateral edges, which limits friction when the plate slides in the lateral mortise 34.

In the example shown, the outside diameter of the intermediate part 25 is smaller than the outside diameter of the end in which the recess is formed, this reduction in diameter being such that the end of the control rod 30 fitted with button 36 can be housed in it. The lateral dimension is then limited.

The reduction in diameter is such that an annular lateral surface 38 can be formed, from which two threaded rods 40 project and on which the tool 4 is mounted.

Figure 6A:
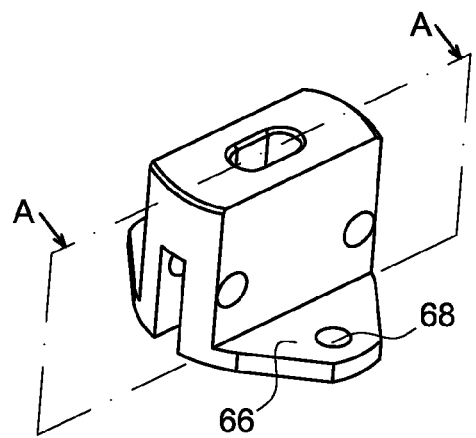
FIG. 6A is a perspective view of an isolated part of the tool of the device in FIG. 1A.
Figure 6B:
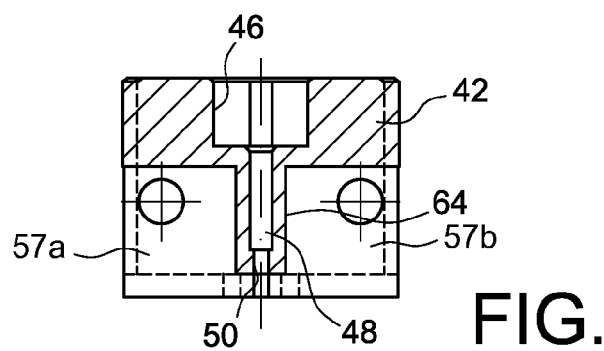
FIG. 6B is a sectional view of the part in FIG. 6A along plane A-A.

The tool 4 that is shown alone in FIGS. 6A and 6B comprises a body 42 provided with a through passage 44 with an axis coaxial to the X-axis through which the electrode will pass. This also forms a housing for the end of the electrode holder so that the electrode can be moved away from the electrode holder or fixed to the electrode holder.

To achieve this, the passage comprises a first portion 46 at one longitudinal end 44.1 of the passage opposite the support with a cross-section capable of blocking the end of the electrode holder in rotation, more particularly the nut 13 that will hold the electrode tight in the electrode holder. The passage 44 comprises a second portion 48 with a smaller cross-section and a third portion 50 with an even smaller diameter providing good guidance when the electrode is inserted in the tool.

In the example shown, the housing has an oblong shaped cross-section and the nut 13 has a hexagonal cross-section, the distance separating the two parallel faces 46.1 from the wall of the oblong housing being approximately equal to the distance separating two parallel faces of the nut 13.

The tool also comprises means 52 for fixing the electrode in the tool. In the example shown, the fixing means 52 are formed by a clamp actuated by the operator.

Figure 7:
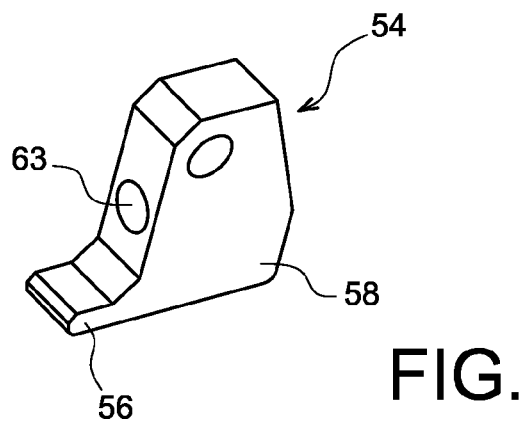
FIG. 7 is a perspective view of an isolated part forming the tool clamp.

The means 52 comprise two parts 54 mounted free to rotate in the body 42 around pins 55 orthogonal to the X-axis. A single part 54 is shown in FIG. 7. The two parts 54 are diametrically opposite each other on opposite sides of the longitudinal X-axis.

Each part 54 is provided with a finger 56 facing the X axis and that will come into contact with the electrode, the electrode then being squeezed between the two fingers 56.

The parts 54 also comprise two manipulation ends 58 radially outwards from the X-axis that the operator uses to move the parts 54 about the pins 55.

The two fingers 56 move towards the electrode in the space separating the tool 4 and the tool support 6.

The body 42 comprises two housings 57a, 57b extending orthogonal to the X axis and located on each side of the X axis, each holding a part 54 as can be seen in FIG. 2.

Means are also provided to return the fingers of the clamp back towards a separated position, consisting of two springs 62 mounted in reaction between parts 54 and a central part 64 of the body 42. In the example shown, the springs 62 are mounted in bores 63 formed in the edge of parts 54.

Furthermore, as already described, the tool is mounted on two threaded rods. To achieve this, the body 42 of the tool 4 comprises two lateral lugs 66 on each side of the X axis, each perforated by a bore 68 through which a threaded rod passes.

The position of the tool 4 relative to the support 6 can then be adjusted by means of nut and counter nut assemblies 70.

The nut and counter nut assemblies 70 adjust the distance between the bottom of the first portion 46 through which the tool body passes against which the electrode holder bears, and the plate 28 of the closer 26.

This distance is the length by which the electrode projects beyond the electrode holder. This distance must be fixed precisely to achieve good welding. Thus, this length is automatically fixed when the electrode is installed. The operator does not need to take any action to adjust this distance.

This electrode replacement device D1 is particularly suitable for changing welding electrodes for which the electrode holder shown in FIG. 8 is relatively small.

We will now explain operation of this electrode replacement device D1.

In order to remove an electrode, the operator disassembles the electrode holder from the welding device; during this step, he manipulates the end of the electrode holder opposite the end from which the electrode projects.

During the next step, he inserts the electrode holder into the tool 4, firstly by inserting the free end of the electrode into the passage in the tool 4 until the electrode holder stops in contact with the bottom of the first portion 46 of the passage 7.

The electrode bears on the upper surface of the plate 28 of the closer 26.

The operator then applies a torque on the electrode holder in the direction to loosen the nut of the electrode holder due to cooperation of the nut and the recess of the first portion 46 of the passage through the tool 4.

The electrode is then no longer fixed to the electrode holder.

The operator then pushes on the two parts 54 of the clamp with one hand to move them towards each other and tighten the electrode which is then fixed in the tool 4, and removes the electrode holder with the other hand.

The operator then releases the parts 54 that move away from the electrode under the effect of springs 62.

The operator then pushes on the button 36 on the control rod 30 of the closer 26 and this action aligns the holes 32, 24 passing through the plate 28 and the wall 18 with each other, such that the electrode drops into the receptacle 2.

With the invention, the operator was able to remove the electrode without needing to touch its sharp end.

The spent electrode can then be scrapped by tipping the receptacle from which the support and the tool have been removed.

To put a new electrode into position, the operator picks up a new electrode from its box by gripping its end that is not sharp. Note that this is the only end that the operator can grip.

He then inserts the electrode into the device by inserting the sharp end of the electrode firstly into the tool 4, and then into the support 6 until it is stopped in contact with the upper face of the plate 28 of the closer 26.

The operator then grips the electrode holder by the end opposite the end that will hold the electrode and installs it on the end of the electrode projecting from the tool 4, this end being not sharp.

The electrode holder is stopped in contact with the bottom of the first portion 46 of the passage 7 of the tool. If the position of the tool 4 relative to the support 6 has been correctly adjusted, the length of the electrode projecting beyond the electrode holder is correct.

The operator then fixes the electrode in the electrode holder by tightening the nut; to do this, he applies a torque on the electrode holder in the direction opposite to the torque applied when the electrode is withdrawn, and the nut is tightened through the recess of the tool 4.

The operator then removes the electrode holder fitted with a new electrode. The electrode holder with a new electrode is ready to be put into position in the welding device.

With the invention, the operator never needs to manipulate the sharp end of the electrode which will be protected during all removal and placement steps of the electrode, and also when scrapping it.

The only steps in which the sharp end of the electrode is "visible" occur during removal of the electrode holder from the welding device and placement of the electrode holder with the new electrode on the welding device; during these steps, the operator does not need to manipulate the replacement device D1, and therefore he can concentrate on the sharp end.

Moreover, the manipulation is very simple, which is particularly advantageous in the case of manipulation in a glove box.

Therefore the risks of gloves being torn by the sharp end are very much reduced.

Precise positioning of the electrode in the electrode holder is also easily achieved.

The device D1 is mobile in the example shown, but it would be possible for the receptacle to fit into a fixed housing of the glove box.

The entire device may be made from a hard material such as stainless steel or anodised aluminium. On the other hand, the plate of the closer is made of stainless steel to guarantee that there are no aluminium particles deposited on the new electrode which could deteriorate the weld quality.

Figure 9A:
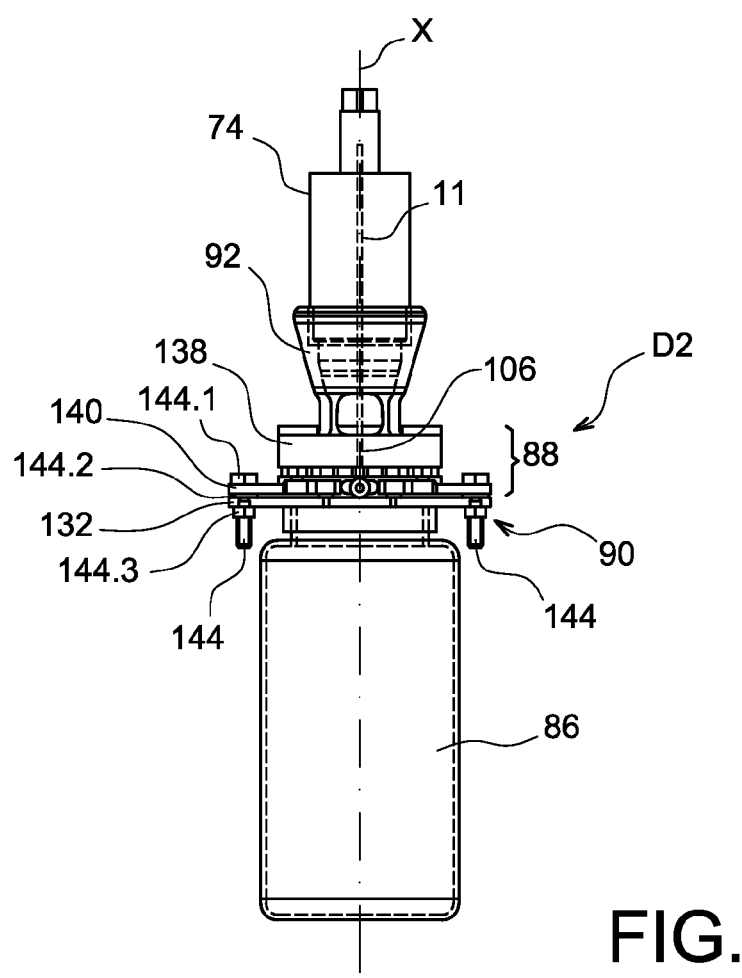
FIG. 9A is side view of a second embodiment of an electrode replacement device.
Figure 9B:
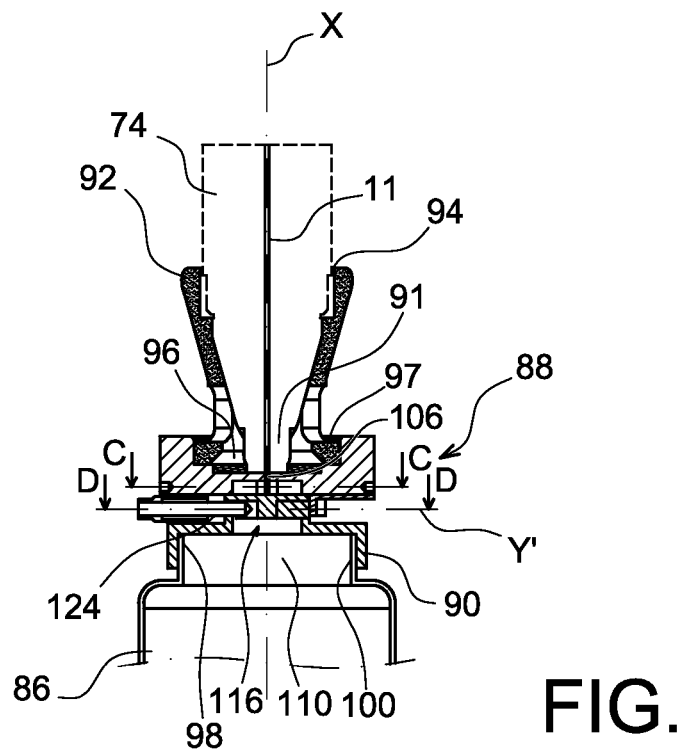
FIG. 9B is a longitudinal sectional view of the upper part of the device in FIG. 9A.
Figure 9C:
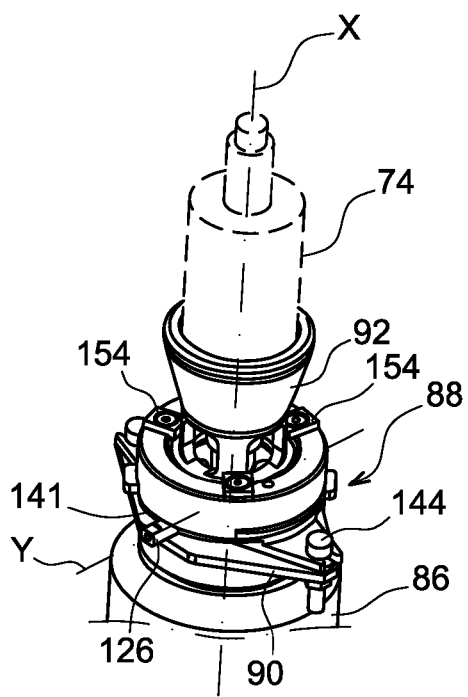
FIG. 9C is a perspective view of the upper part of the device in FIG. 9A.

FIGS. 9A to 9C show another example embodiment of an electrode replacement device D2 particularly suitable for replacement of seal welding electrodes designed for welding the end of rod plugs.

However, as we will explain later, the device D2 may be adapted to the replacement of welding electrodes.

The device D1 may be adapted to the replacement of seal welding electrodes.

Figure 18:
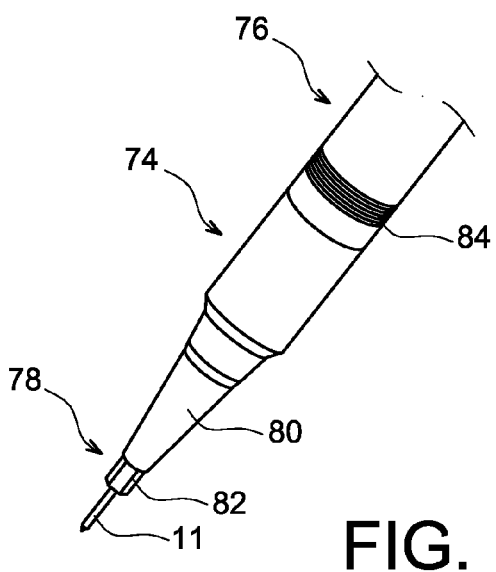
FIG. 18 is a perspective view of a tool holder fitted with an electrode to which the device in FIG. 9A is particularly well suited.

Firstly, we will describe an example of a seal welding electrode holder shown in FIG. 18.

The seal welding electrode holder 74 comprises a body 76 in which the mandrel 78 holding the electrode is surrounded by a tapered porcelain part 80; the end of the mandrel projects from the tapered part 80 and is provided with a nut 82 to tighten the electrode 11 in the body 76.

The body 76 in the example electrode holder shown also comprises a thread 84 on the upper part of the tapered part 80 that will be used to fit it in the seal welding device.

Like device D1, device D2 comprises a receptacle 86, and electrode replacement tool 88 and a tool support 90 mounted on the receptacle 86 and supporting the electrode replacement tool 88. A closable passage 91 passes axially through the device.

The electrode replacement tool 88 will be referred to as "tool 88" in the remainder of the description for reasons of simplicity.

Figure 10:
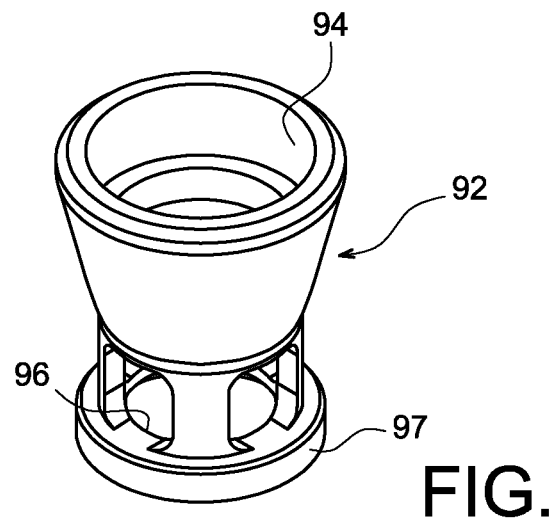
FIG. 10 is a perspective view of an isolated part of the device in FIG. 9A forming an electrode holder support.

The device D2 also comprises an electrode holder support 92 mounted on the tool 88 shown in FIG. 10. The electrode holder support 92 may for example be made of ERTALON®.

The electrode holder support 92 is approximately in the form of a truncated hollow cone with an internal profile corresponding to the external profile of the tapered part 80 of the electrode holder 76, the cone 80 being designed to be inserted in the support 92.

The electrode holder support 92 comprises a large diameter opening 94 through which the electrode holder 74 is inserted, and a small diameter opening 96 from which the end of the electrode holder and the sharp end of the electrode project.

The small diameter opening 96 is advantageously surrounded by an annular ring 97 forming a support stand for the electrode holder support 92 when the electrode holder is mounted on the tool 88.

In the example shown, there are advantageously holes in the end of the electrode holder support 92 on the side of the opening 96, so that the operator can see the electrode as it is put into place.

As for the device D1, the receptacle 86 is formed from a flask provided with an upper orifice 98 surrounded by a neck 100.

A support structure (non-shown) holding the receptacle in the vertical position identical to the support structure 12 of the device D1 may also be provided The neck 100 is advantageously provided with a thread that fixes the support 90 onto the receptacle 86. However, other means of fixing could be provided, for example click fitting or a bayonet type connection.

The structure of the support 90 is very similar to the support 6 of device D1.

Figure 11A:
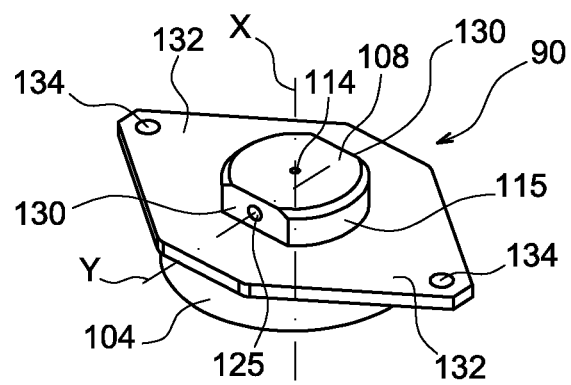
FIG. 11A is a perspective view of an isolated part of the device in FIG. 1A forming the support.
Figure 11B:
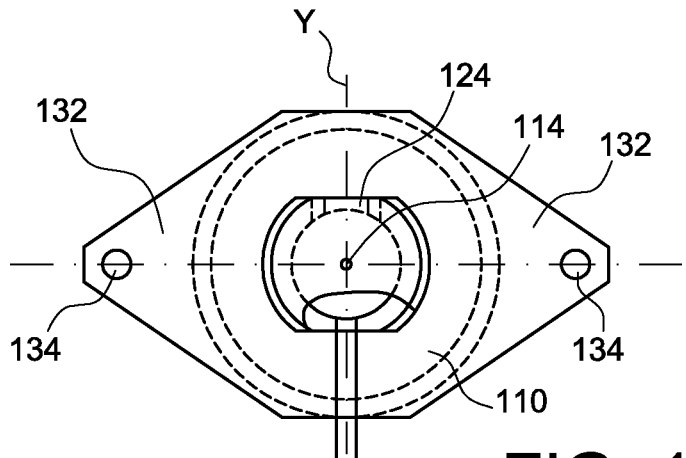
FIG. 11B is a top view of FIG. 11A.

The tool support 90, that can be seen particularly clearly in FIGS. 11A and 11B, comprises a body 104 with a longitudinal X-axis, provided with a through passage 106 with a longitudinal X axis through which a spent electrode will pass towards the inside of the receptacle 86.

The body 104 comprises an end wall 108 facing the tool 88 at a first longitudinal end and a circular recess 110 surrounded by an internal thread cooperating with the thread on the neck 100 of the receptacle at a second longitudinal end, therefore the neck 100 is housed in the recess 110.

The wall 108 comprises an orifice 114 forming one end of the passage 106.

The body 104 comprises an intermediate part 115 between the end wall 108 and the recess 110, housing a closer 116 of the orifice 114 mounted free to move in the body 104 along a Y axis orthogonal to the longitudinal axis.

The closer 116 slides along one face of the wall 108 facing away from the tool 88.

Figure 12:
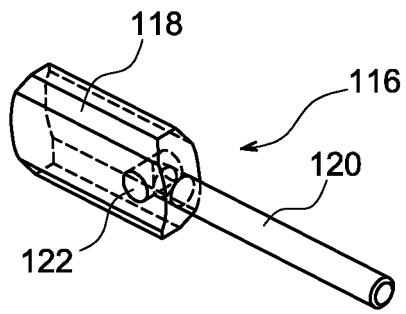
FIG. 12 is a top view of a closer that will be installed in the support in FIG. 11A.

FIG. 12 shows an example of a slide type closer 116 shown alone, comprising a plate 118 and a control rod 120 fixed to one end of the plate 118.

The plate 118 is provided with a through orifice 122 with a sufficiently large diameter so that an electrode can pass through.

The intermediate part 115 comprises a sidewall provided with a lateral mortise 124 inside which the plate 118 slides, and a diametrically opposite transverse bore 125 with a Y axis inside which the control rod 120 slides.

When the plate 118 is moved by the control rod 120 along the Y axis, the orifice 122 of the plate 118 may be aligned with the through orifice 114 in the end wall 108, so that an electrode can pass through the support 90.

Figure 16A:
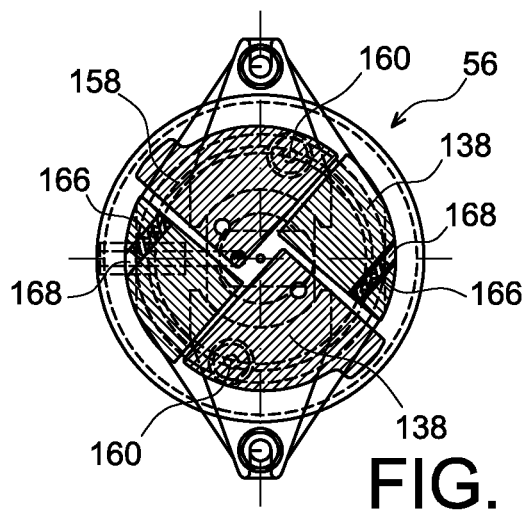
FIGS. 16A and 16B are cross-sectional views along two parallel planes C-C and D-D of the device in FIG. 9B, in the rest position.
Figure 16B:
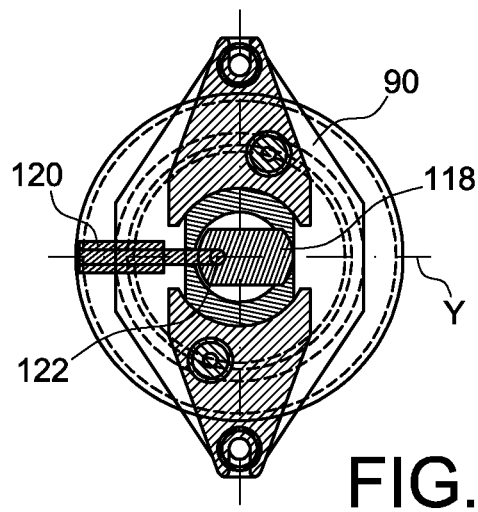

The plate 118 is normally in the closed position (FIG. 16B).

Advantageously, an elastic return means is provided to bring the plate 118 back into a position in which the through orifice 114 is closed.

In the example shown, a helical spring 124 is mounted in reaction between the outer surface of the intermediate part 115 and a button 126 fixed to the free end of the control rod 120.

Figure 17A:
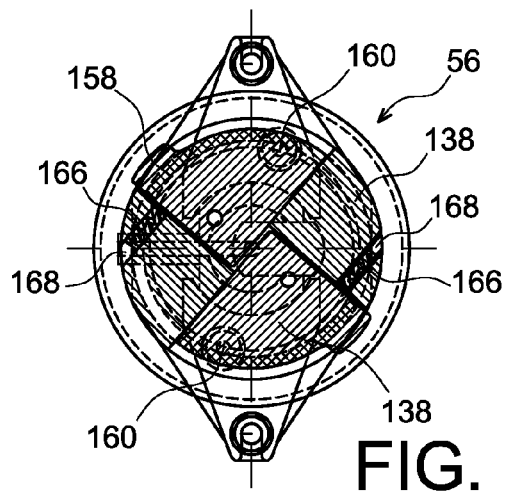
FIG. 17A is a view identical to that in FIG. 16A, the clamp being in the tightened position on the electrode.
Figure 17B:
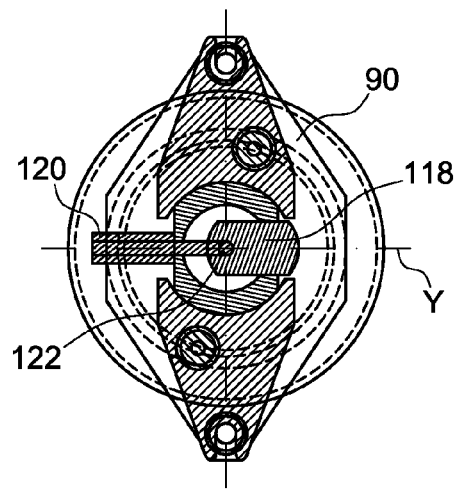
FIG. 17B is a view identical to that in FIG. 16B, with the closer in the open position.

In the example shown, the through orifice 122 of the plate 118 is positioned such that a force has to be applied onto the control rod 120 in the direction of the X axis, to align it with the through orifice 114 in the end wall (FIG. 17B).

As a variant, the closer may be designed such that the force applied to it is away from the X axis to align the orifices 114 and 122.

In the example shown, the plate comprises slender lateral edges to reduce friction when the plate slides in the lateral mortise 124.

A closer in which the control rod 120 is formed by a prolongation of the plate is not outside the scope of this invention.

In the example shown, the intermediate part 115 is advantageously provided with two flats 130 on its lateral surface arranged on each side of the X axis and parallel to each other, to prevent blockage in a part denoted 136 forming a base of the tool 88 and that can be seen in FIGS. 13 A to 13C.

The support 90 is also provided with two laterally projecting lugs 132 extending on each side of the X axis and in a plane perpendicular to the X axis, each lug being provided with a bore 134 in which the tool 88 can be fitted.

Figure 13A:
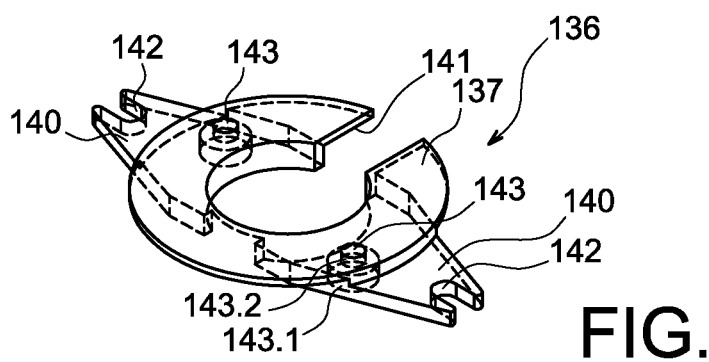
FIG. 13A is a perspective view of one of the parts of the tool in the device in FIG. 9A.
Figure 13B:
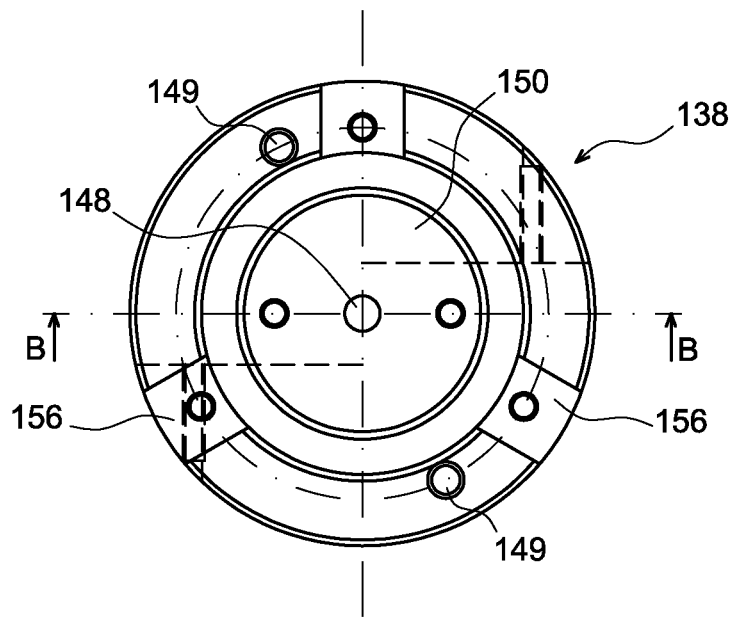
FIG. 13B is a top view of another part of the tool fixed onto the part in FIG. 13A.
Figure 13C:
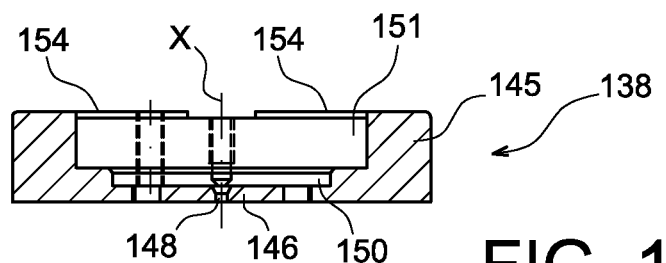
FIG. 13C is a sectional view of the part in FIG. 13A along plane B-B.

The tool 88, shown alone in FIGS. 13A to 13C, is formed principally of three parts in the example shown, a first part 136 forming the attachment base of the tool to the support, a second part 138 forming a guide for placement of the electrode holder support 92 and a tightening-loosening plate 140 cooperating with the nut of the electrode holder.

The attachment base 136 comprises an annular shaped attachment surface 137 of the guide part 138 and two lugs 140 projecting on each side of the X axis.

Each lug 140 is provided with a passage 142 housing threaded rods 144 each extending between a lug 132 of the support and a lug 140 of the attachment base 136 of the tool 88.

The passages in the two lugs 140 are advantageously formed by notches rather than bores to make it easier to fit the threaded rods 142.

In the example shown, the upper faces of the lugs 142 and of the attachment plate 137 are in two different planes.

In the example shown, the attachment plate 137 comprises a slit 141 such that the plate section is C-shaped when viewed from above.

This slit 141 advantageously houses the control rod 120 of the closer 116, such that a more compact device can be obtained as can be seen in FIG. 13A.

The attachment base 136 also comprises two radially opposite drillings 143 made in the attachment plate 137, in which there are pins around which the clamping parts of the electrode that will be described below are free to pivot.

The drillings comprise a first large diameter portion 143.1 and a smaller diameter portion 143.2 that will house a head of the pin in the large diameter portion 143.1 and avoid the need for projecting parts that could make assembly on the support 90 difficult.

In the example shown, the diameter on which the two drillings 143 are located is not in line with the axis between the two notches 142, so that the clamping parts can be handled.

In the example shown, the threaded rods 142 comprise a head 144.1 at one end and a collar 144.2 along their axis and perpendicular to its axis, the distance separating the head from the collar being such that the lugs 140 can be inserted.

The lugs 140 of the attachment base 136 fit between the head 144 and the collar of each screw.

A nut 144.3 is screwed onto the part of each threaded rod 142 located under the lug of the support 90. The distance between the support 90 and the tool 88 can be adjusted by tightening or loosening the nuts 144.3, which fixes the length of the electrode projecting from the electrode holder.

The guide part 138 (FIGS. 13B and 13C) has an approximately annular wall 145 about the X axis closed off at a longitudinal end by an end wall 146. The end wall 146 also comprises a through bore 148 along the X axis at its centre through which the electrode can pass.

Drillings 149 in line with the drillings 143 in the attachment base 136 are made in the guide part.

The annular wall 145 and the end wall 146 delimit a housing 151 with diameter approximately equal to the outside diameter of the support stand 97 of the electrode holder support 92.

Figure 15:
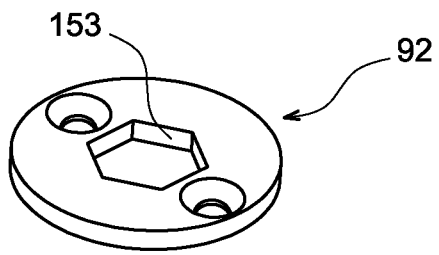
FIG. 15 is a perspective view of an isolated part for tightening and loosening the mandrel.

In the example shown, the end wall 146 comprises a recess 150 on the side of the housing 148 in which a plate 152 is fixed, shown in FIG. 15, fitted with an opening 153 with a shape corresponding to the impression of the electrode holder nut into which this nut will fit and that will cooperate with it to tighten and loosen the nut.

This plate 152 is fixed for example by screws in the bottom of the housing 151 such that it can be replaced, for example if it is spent or if it is required to use the device with nuts with a different impression.

If it is not required to replace this plate, it can be fixed permanently, for example by gluing or welding.

Advantageously, the guide part 138 comprises means 154 to hold the electrode holder support 92 in the axial position, while leaving it free to rotate about the X axis.

In the example shown, the means 154 are formed by three retaining tabs fixed on the upper face of the guide part 138 and forming an axial stop for the support stand for the electrode holder support 92, preventing it from being moved away from the tool 88.

In the example shown, the guide part 138 comprises three notches 156 formed in its upper face at 120° from each other and in each of which a retaining plate 154 is fixed. The plates 154 may for example be fixed by screws.

The tool 88 also comprises means 156 of fixing the electrode in the tool 88. The fixing means 156 form a clamp comprising two tightening parts 158 each being articulated about a pin 160 parallel to the X axis.

Figure 14:
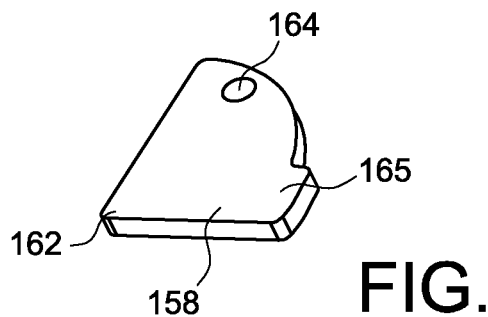
FIG. 14 is a perspective view of an isolated part forming the tool clamp.

In this embodiment, the elements of the clamp move in a plane orthogonal to the X axis. In FIG. 14, one of the parts 158 is shown alone. In FIG. 16A, the tightening parts 158 are visible in the rest position which corresponds to the moved away position, and in FIG. 17A, the tightening parts are in contact with the electrode.

The tightening parts 158 are approximately in the shape of a quarter disk, the zone with a right angle 162 being designed to come into contact with the electrode.

The tightening parts comprise a bore 164 through which the pin 160 passes, located approximately in the corner formed between the rounded edge of the clamping part 158 and a flat edge. The rounded edge also comprises a projecting portion 165 opposite the bore so that the operator can handle the clamping parts. One end of the pins 160 is mounted in the bores 143.1, 143.2 of the attachment base 136 and the other end is mounted in the bores 149 of the guide part. Advantageously, the bores 149 are tapped and the axes 160 are advantageously formed by screws screwed into the bores 149, thus fixing the guide part onto the attachment base.

Means 166 are advantageously provided to return the clamping parts into the moved away position, for example they may be springs 166 mounted in reaction between the guide part and the clamping parts, the springs 166 are installed in the bores 168 formed in the guide part.

The quarter disk shape makes it possible to integrate the clamping parts into the tool which has a circular cross section, and only the two handling portions project.

This makes the device more compact.

In the same way as for D1, the entire device D2 may be made from a hard material such as stainless steel or anodised aluminium.

On the other hand, the plate 118 of the closer 116 is made of stainless steel to guarantee that no aluminium particles are deposited on the new electrode, which could deteriorate the weld quality.

We will now explain operation of the electrode replacement device D2.

The electrode holder is removed from the seal welding device and is screwed into the electrode holder support 92.

In the case in which the electrode holder support 92 is not fixed to the tool 88, the operator preferably puts the electrode holder support 92 into position on the tool 88 putting the support stand 97 into position in the housing 151 of the guide part 138 and the operator then screws the electrode holder into the electrode holder support 92 to limit risks of pitting.

The electrode holder nut is housed in the recess 153 of the plate 154, and the electrode holder is then screwed into the electrode holder support 92.

The operator stops screwing when the nut is stopped in contact with the end wall 146 of the guide part 138.

The operator separates the electrode from the electrode holder by loosening the nut, and to do this he applies a torque to the electrode holder support 92 about the X axis which rotates the electrode holder about the X axis. Since the nut is fixed in rotation inside the plate 154, it is loosened.

Remember that the electrode holder support 92 is free to rotate about the X axis.

The electrode is then freed from the electrode holder.

In the case in which the electrode holder support 92 does not comprise a tapping cooperating with the electrode holder thread, the operator applies an axial force on the electrode holder towards the support 92, at the same time as he applies the rotation torque.

Cooperation between the conical shapes naturally generates blocking in rotation between the electrode holder support 92 and the electrode holder, and the loosening torque applied to the electrode holder support 92 is also transmitted to the electrode holder.

The operator applies a force on the clamping parts 158 to trap the electrode 11 and hold it in the tool, and at the same time he removes the electrode holder (FIG. 17A).

The operator then releases his force on the clamping parts 158 that then move away from the electrode 11 under the effect of the springs 166, releasing it and moves the closer 116 to align the bores 122, 114 of the closer 116 and the support 90, by pushing on the button of the control rod 120, and when this alignment is obtained, the electrode 11 drops into the receptacle 86 by gravity (FIG. 17B).

The operator puts a new electrode 11 into position by picking up a new electrode by its end that is not sharp, puts it into position into the tool by the sharp end until the sharp end comes into contact with the upper face of the plate 118 of the closer 116.

The operator then puts the electrode holder onto the tool 88 by inserting the end that is not sharp of the electrode into the electrode holder.

The electrode holder is then screwed into the electrode holder support 92.

The operator then applies a torque to the electrode holder support 92 in the direction to tighten the electrode holder nut, and the electrode 11 is then fixed to the electrode holder.

The electrode holder is then unscrewed from the electrode holder support 92 and is removed from the electrode holder support 92 and is put back into position in the seal welding device.

In the example shown, the electrode holder support 92 is axially fixed to the tool 88, but it could be possible for it to be made independent, it would be screwed onto the electrode holder separately and the assembly thus formed would be installed in the tool.

The main difference between device D2 and device D1, apart from the presence of the electrode holder support 92, is the orientation of the clamping parts of means for fixing the electrode in the device, which are mobile in the horizontal plane in device D2 while they are mobile in the vertical plane in device D1.

The device D2 may very easily be adapted to a welding electrode holder, for example by modifying the shape of the housing of the guide part such that it forms a housing corresponding to the impression of the nut of the welding electrode holder.

Devices D1 and D2 comprise a mobile spent electrode receptacle, it would be possible for this receptacle to be made directly in the work bench in the glove box and to be accessible elsewhere, and for example it could be emptied automatically, further limiting risks of contact.

Electrode replacement devices according to this invention protect the operator during all steps to remove and place an electrode, therefore risks of gloves being torn off are considerably reduced. Furthermore, spent electrodes are handled only through the receptacle, which is closed again before it is taken out of the glove box.

The operator only comes into contact with new electrodes and only at their part that is not sharp.

Electrode replacement devices according to this invention also have the advantage that they are very robust. Operation is entirely mechanical and does not require any complex structure. Furthermore, they are very compact due to their vertical configuration.

Tool 88 of device D2 has a very low height, due to the horizontal orientation of the clamping parts which compensates for the height of the electrode holder support 92.

Making a device D1 with clamping parts oriented horizontally as in device D2 can advantageously result in device with a relatively low height.

The closer could be actuated automatically, for example by a pneumatic control.

The invention claimed is:

1. Device for removing an electrode from an electrode holder and/or fitting an electrode into an electrode holder, said electrode holder forming part of a welding device, said device comprising: a spent electrode receptacle provided with an orifice and an assembly mounted on said orifice, said assembly comprising a through passage with a longitudinal axis connecting the receptacle and a housing for holding one end of the electrode holder forming a mandrel, said longitudinal axis being approximately vertical, means of tightening or loosening the electrode holder mandrel, means of fixing the electrode to said device, and means of enabling or disabling dropping of the spent electrode into the receptacle.

2. Device according to claim 1, wherein said assembly comprises a tool comprising the housing to hold one end of the electrode holder forming a mandrel, and the means of tightening or loosening the electrode holder mandrel, the means of fixing the electrode to said device, and a support mounted on the orifice of the receptacle and comprising the means of enabling or disabling dropping of the spent electrode into the receptacle.

3. Device according to claim 2, further comprising an electrode holder support, the electrode holder comprising a tapered part at its end holding the electrode, said electrode holder support forming a tapered housing corresponding to the shape of the tapered part of the electrode holder and forming an upstream extension of the housing to hold one end of the electrode holder forming a mandrel, in which the electrode holder support is fixed to said tool along its axial direction and is free to pivot relative to it about the longitudinal axis.

4. Device according to claim 3, wherein the electrode holder support comprises an annular stand opposite an end through which the electrode holder is inserted, said stand fitting into a housing in said tool.

5. Device according to claim 1, wherein the means of tightening or loosening the electrode holder mandrel are formed by a recess present in said housing to hold one end of the electrode holder forming a corresponding to the impression of a mandrel tightening/loosening nut.

6. Device according to claim 5, wherein the recess is formed directly by the sidewalls of the housing to hold one end of the electrode holder forming a mandrel.

7. Device according to claim 5, wherein the recess is formed in a plate fixed in the bottom of the housing to hold one end of the electrode holder forming a mandrel.

8. Device according to claim 1, wherein the means of fixing the electrode to said device comprise two elements mobile about two axes and provided with two ends designed to come into contact with the electrode to grip it.

9. Device according to claim 8, wherein the two mobile elements are contained in a plane containing the longitudinal axis.

10. Device according to claim 8, wherein the two mobile elements are contained in a plane perpendicular to the longitudinal axis.

11. Device according to claim 8, comprising means for returning the two mobile elements in a position moved away from each other, to fix the electrode to said device.

12. Device according to claim 1, wherein the means of enabling or disabling dropping of the spent electrode into the receptacle comprise a closer closing off the through passage, in which there is an orifice that is not aligned with said through passage when in the rest position, and which can be aligned with it by manipulating the closer.

13. Device according to claim 12, wherein the closer is installed free to slide along an axis orthogonal to the longitudinal axis in a support.

14. Device according to claim 12, comprising means for returning the closer into the position to close off the through passage.

15. Device according to claim 12, wherein the closer comprises a plate provided with said orifice and a control rod accessible from outside the support.

16. Device according to claim 12, comprising means of adjusting the distance between the closer and the housing to hold one end of the electrode holder forming a mandrel.

17. Device according to claim 16, wherein said assembly comprises a tool comprising the housing to hold one end of the electrode holder forming a mandrel, and the means of tightening or loosening the electrode holder mandrel and the means for fixing the electrode to said device, and a support mounted on the orifice of the receptacle and comprising the means of enabling or disabling dropping of the spent electrode into the receptacle, wherein the tool is installed on a support by at least two threaded rods, the means of adjusting are formed by nut and/or counter-nut assemblies screwed onto the threaded rods.

18. Device according to claim 1, also comprising an electrode holder support, the electrode holder comprising a tapered part at its end holding the electrode, said electrode holder support forming a tapered housing corresponding to the shape of the tapered part of the electrode holder and forming an upstream extension of the housing to hold one end of the electrode holder forming a mandrel.

19. Device according to claim 18, wherein the electrode holder support comprises an internal thread to cooperate with a thread on the electrode holder, said internal thread being on the upstream side of the tapered housing.

20. Device according to claim 18, wherein said assembly comprises a tool comprising the housing to hold one end of the electrode holder forming a mandrel, and the means of tightening or loosening the electrode holder mandrel and the means for fixing the electrode to said device, and a support mounted on the orifice of the receptacle and comprising means of enabling or disabling dropping of the spent electrode into the receptacle and means of axially retaining the electrode holder support formed by tabs fixed on the tool.

21. Method for removing an electrode from an electrode holder using a device for removing an electrode from an electrode holder and/or fitting an electrode into an electrode holder, said electrode holder forming part of a welding device, said device comprising a spent electrode receptacle provided with an orifice and an assembly mounted on said orifice, said assembly comprising a through passage with a longitudinal axis connecting the receptacle and a housing for holding one end of the electrode holder forming a mandrel, said longitudinal axis being approximately vertical, means of tightening or loosening the electrode holder mandrel, means of fixing the electrode to said device and means of enabling or disabling dropping of the spent electrode into the receptacle, said method comprising the following steps:

inserting the electrode holder into the housing to hold one end of the electrode holder forming a mandrel, a mandrel tightening element penetrating into the tightening/loosening means and a free end of the electrode coming into contact with a closer, applying a loosening torque to the electrode holder, fixing the electrode to said device, removing the electrode holder, detaching the electrode from said device, opening the through passage leading to the receptacle such that the electrode drops by gravity into said receptacle.

22. Method for removing an electrode according to claim 21, the device further comprising an electrode holder support, the electrode holder comprising a tapered part at its end holding the electrode, said electrode holder support forming a tapered housing corresponding to the shape of the tapered part of the electrode holder and forming an upstream extension of the housing to hold one end of the electrode holder forming a mandrel, wherein the loosening torque is applied to said electrode holder support and transmitted to the electrode holder.

23. Method for removing an electrode according to claim 22, the electrode holder support comprising an internal thread to cooperate with a thread on the electrode holder, said internal thread being on the upstream side of the tapered housing, wherein the electrode holder is screwed into the electrode holder support when the electrode holder is inserted into the housing to hold one end of the electrode holder forming a mandrel.

24. Method of fitting an electrode into an electrode holder using a device for removing an electrode from an electrode holder and/or fitting an electrode into an electrode holder, said electrode holder forming part of a welding device, said device comprising a spent electrode receptacle provided with an orifice and an assembly mounted on said orifice, said assembly comprising a through passage with a longitudinal axis connecting the receptacle and a housing for holding one end of the electrode holder forming a mandrel, said longitudinal axis being approximately vertical, means of tightening or loosening the electrode holder mandrel, means of fixing the electrode to said device and means of enabling or disabling dropping of the spent electrode into the receptacle, said method comprising the following steps:

putting the electrode into place in the passage, a sharp end of the electrode coming into contact with a closer, putting the electrode holder with no electrode into position in the housing to hold one end of the electrode holder forming a mandrel, applying a tightening torque to the mandrel, fixing the electrode to the mandrel, removing the electrode holder fitted with the electrode.

25. Method for placing an electrode according to claim 24 the device further comprising an electrode holder support, the electrode holder comprising a tapered part at its end holding the electrode, said electrode holder support forming a tapered housing corresponding to the shape of the tapered part of the electrode holder and forming an upstream extension of the housing to hold one end of the electrode holder forming a mandrel, wherein the tightening torque is applied to said electrode holder support and transmitted to the electrode holder.

26. Method for placing an electrode according to claim 25, the electrode holder support comprising an internal thread to cooperate with a thread on the electrode holder, said internal thread being on the upstream side of the tapered housing, wherein the electrode holder is screwed into the electrode holder support before or during insertion of the electrode holder into the housing to hold one end of the electrode holder forming a mandrel, and the electrode holder is moved away from the electrode holder support before or during removal of the electrode holder.

* * * * *